May 5, 1970  L. R. RUBIN  3,510,157

SEAL FOR HYDROGEN DIFFUSION APPARATUS

Filed June 30, 1967

INVENTOR.
LEONARD R. RUBIN
BY Robert A. Honor
ATTORNEY

United States Patent Office 3,510,157
Patented May 5, 1970

3,510,157
SEAL FOR HYDROGEN DIFFUSION APPARATUS
Leonard R. Rubin, Union, N.J., assignor to Engelhard Industries, Inc., Newark, N.J., a corporation of Delaware
Filed June 30, 1967, Ser. No. 650,432
Int. Cl. F16l 13/02
U.S. Cl. 285—286                               4 Claims

ABSTRACT OF THE DISCLOSURE

This disclosure relates to a seal for securing thin palladium tubing to hydrogen diffusion apparatus. The seal is provided by welding the tubing to a metal insert having a fluxless braze portion as an integral part thereof.

BACKGROUND OF THE INVENTION

Various methods have been proposed and used for sealing thin palladium tubing into hydrogen diffusion apparatus. Most of these methods have been quite unsatisfactory. The problem appears to be based partially on the unusually high degree of expansion and contraction undergone by the tubing and partially on torsional and axial stresses generated at the seals by restraints elsewhere along the diffusion tubing. Expansion caused by the absorption of hydrogen by the palladium containing tubing is probably the largest single factor to result in the problem.

The sealing methods used heretofore generally involved welding or brazing thin palladium tubing to the base metal hydrogen diffusion apparatus. The most difficult part of a precious metal to base metal braze has always been the lack of assurance of adequately wetting the base metal. Flux is generally used in those situations where the geometry of the system does not allow furnace brazing in a protective atmosphere. But flux tends to contaminate the seals and is preferably avoided. Moreover, these purification systems cannot be heated to furnace temperatures without damaging the thin tubing. One method that has been used for sealing diffusion tubing involves the use of nickel "inserts" welded to the thin palladium tubing. "Inserts" are members which provide a means for connecting the tubing to the walls of diffusion equipment. The use of inserts is desirable since it permits sealing methods by which a joint such as a welded joint may be fabricated at a distance from the wall of the diffusion apparatus thereby minimizing the amount of metal which must be heated and making the weld easier to prepare. The method using nickel inserts has not proved entirely satisfactory, however, since the experience has shown that many leaks develop in such seals near the weld bead. Apparently, the palladium tubing is weakened in that zone by the high temperatures required for welding. Moreover, this method is not applicable for sealing a tube to inserts of metals particularly useful in hydrogen diffusion apparatus, e.g. stainless steel, because of the tendency of the weld beads to contain blowholes and because of the tendency of these beads to become embrittled in hydrogen.

SUMMARY OF THE INVENTION

In a seal for securing thin palladium tubing into hydrogen diffusion apparatus, the tubing is secured to an insert which has been provided with a counterbore recess extending from one terminal end toward the other end of said insert and a fluxless precious metal braze which is located in said recess and is an integral part of said insert, the braze having a thickness of the same order of magnitude as the thin tubing.

In a preferred method, the pre-formed fluxless braze portion is made by placing a fluxless precious metal braze in a recess in the tapered end of an insert, melting the braze "in-situ" in a nonoxidizing atmosphere and, after cooling, boring the brazed end of the insert to accommodate a diffusion tube while leaving a portion of the braze as an integral part of the insert. After the tubing is inserted, that part of the insert having the braze is welded to the palladium tubing causing the braze to flow and form a tight, rugged seal. This invention overcomes the problems encountered with prior art sealing methods. The welding technique of the present method is used to provide heat to cause the braze to flow. The weakened region adjacent to the braze joint is accordingly eliminated because the flowing temperature for the braze is lower than the welding temperature. The seal is not dependent on the weld bead, but sealing occurs all along the brazed portion of the insert. In contrast to the prior art seal made with just the weld bead, the bottom edge of the brazed region is not normally all in the same plane and the tubing is therefore more capable of resisting the resulting stresses.

DESCRIPTION OF PREFERRED EMBODIMENTS

The seals of this invention utilize as critical elements thereof a fluxless braze which is made an integral part of a suitable metal insert. The insert with the braze therein is formed and preferably secured to the apparatus wall prior to joining the palladium tubing to the insert.

Precious metals generally and their alloys may be used as the braze. It is important, however, that the melting point of the braze used be compatible with the conditions of operation of the hydrogen diffusion apparatus. Additionally, the braze should not require too high a temperature for welding. To avoid unnecessary overheating and stress formation during seal preparation, the braze should have a melting point of about 1,050°–1,300° C. and a melting point of about 1,150°–1,250° C. is preferred. Those brazes which may be used include silver-palladium alloys, gold, gold-nickel alloys and the like. An alloy containing 90 weight percent silver and 10 weight percent palladium has been found particularly satisfactory.

The present process allows the making of the integrated braze-insert in a protective atmosphere where good wetting and minimal contamination will result. The braze is inserted in a recess in the metal insert and is heated in a nonoxidizing atmosphere, such as hydrogen or inert gas. Use of a vacuum during heat treating the braze is also contemplated. The braze is heated to between 1,050° and 1,300° C. as required to ensure complete melting. This procedure provides a unit comprising the insert with the braze as an integral part thereof.

Figure 1:
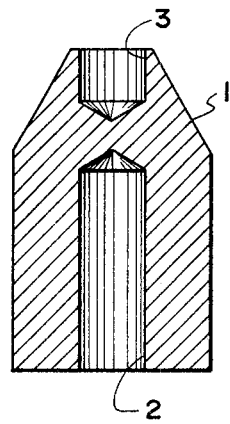
FIG. 1 is a cross-sectional view of an embodiment of an insert used in connection with the method of this invention.

Referring to FIG. 1, the insert useful in connection with this invention may be shaped substantially as shown. It may be made of any material suitable for use in hydrogen diffusion apparatus such as stainless steel, nickel, Inconel, and the like. Stainless steel is preferred. The insert 1 preferably has a bore 2 extending through a substantial portion thereof. A recess 3 is present to receive addition of the braze. Braze is added to recess 3 and both the insert and braze are then heat treated in the nonoxidizing atmosphere as described above. A tubular bore is then placed through the braze and the insert so as to form the combination of elements shown in FIG. 2. A portion of the braze 4 is permitted to remain so as to form a rim which has a thickness $x$. The rim circumscribes newly formed bore 5 which is generally, but not necessarily, the same diameter as bore 6.

Figure 2:
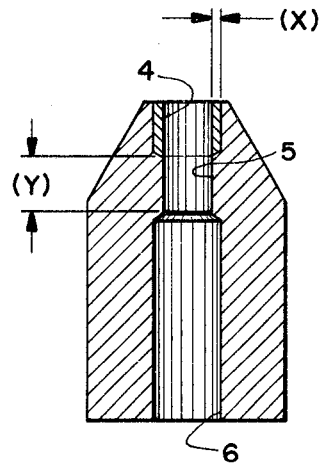
FIG. 2 is a representation of a cross-section of one embodiment of the unfinished seals of the present invention.

The insert as shown in FIG. 2 is then appropriately placed in the hydrogen diffusion apparatus, such as in the tube sheet, and is preferably secured to the tube sheet by welding. Normal welding procedures may be used such as arc welding.

The dimension $x$ is preferably in the same order of magnitude as the thickness of the tube to which it is to be welded. For instance, when tubing having wall thickness of 4–6 mils is used, the rim 4 thickness $x$ may be about 6 mils. The dimension $y$ shown in FIG. 2 is not critical and may or may not be present. In the preferred embodiment, however, a bore of dimension $y$ remains after the bottom portion of recess 3 is removed.

Figure 3:
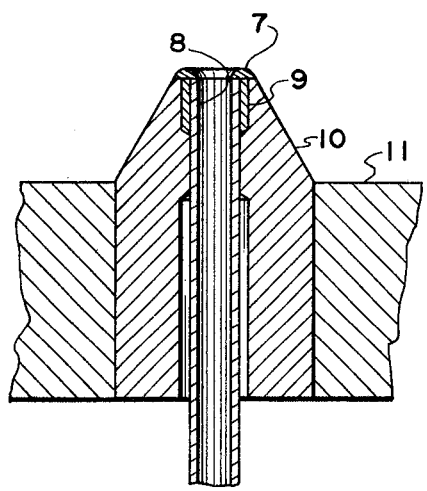
FIG. 3 represents a cross-sectional view of one embodiment of the complete seal including insert, braze, and tubing.

The diffusion tubing is thereafter inserted into the modified insert and welded thereto at the braze portion using a normal welding procedure such as a shielded arc technique. FIG. 3 depicts the arrangement in the final welded seal of the tubing, the braze rim, and the insert. The weld 7 is shown in relation to the tubing 8, the braze rim 9 and the insert 10. The entire seal is shown in relation to the tube sheet 11.

It should be understood that although this invention has been described with reference to particular embodiments thereof, changes and modifications may be made which are within its intended scope.

What is claimed is:
1. A seal for securing thin tubing comprising palladium into hydrogen diffusion apparatus, which comprises:
   (a) an insert, having a wall means defining a bore therethrough, for fixed placement in a hydrogen diffusion apparatus wall,
   (b) a counterbore recess in said insert, said counterbore recess extending from one terminal end of the insert toward the other end of the insert,
   (c) thin tubing comprising palladium disposed within said insert, said tubing having a maximum outside diameter less than the minimum diameter of said wall means defining said bore,
   (d) a fluxless braze comprising precious metal located within said recess, said braze being an integral part of said insert and having a thickness of the same order of magnitude as said thin tubing, the tubing being secured to the insert by the braze.

2. A seal according to claim 1 wherein the braze has a melting point of about 1,050°–1,300° C.

3. A seal according to claim 2 wherein the braze is in the form of the rim circumscribing the tubing.

4. A seal according to claim 1 wherein the insert consists essentially of stainless steel and the braze consists essentially of an alloy of about 90 weight percent silver and about 10 weight percent palladium.

References Cited

UNITED STATES PATENTS

| | | | |
|---|---|---|---|
| 2,117,106 | 5/1938 | Silliman | 29—494 |
| 2,495,615 | 1/1950 | Von der Clute | 285—158 X |
| 2,785,459 | 3/1957 | Carpenter | 285—422 X |
| 2,807,445 | 9/1957 | Gardner | 285—286 X |
| 2,824,756 | 2/1958 | Wagner | 285—287 X |
| 3,055,098 | 9/1962 | Bratkowski et al. | 29—504 X |
| 3,119,632 | 1/1964 | Skinner | 285—286 X |
| 3,279,154 | 10/1966 | Emerson et al. | 55—158 |
| 3,427,707 | 2/1969 | Nowosacko | 285—287 X |

DAVID J. WILLIAMOWSKY, Primary Examiner

D. W. AROLA, Assistant Examiner

U.S. Cl. X.R.

29—494; 285—422